United States Patent [19]

Mayer

[11] 4,355,661
[45] Oct. 26, 1982

[54] DUAL SOLENOID VACUUM MODULATOR

[75] Inventor: Endre A. Mayer, Birmingham, Mich.

[73] Assignee: The Bendix Corporation, Southfield, Mich.

[21] Appl. No.: 142,525

[22] Filed: Apr. 21, 1980

Related U.S. Application Data

[62] Division of Ser. No. 946,883, Sep. 28, 1978, Pat. No. 4,258,749.

[51] Int. Cl.³ .............................................. F15B 13/044
[52] U.S. Cl. ....................................... 137/881; 91/459; 137/596.17
[58] Field of Search ................... 137/596.17, 879, 881; 251/129; 91/459

[56] References Cited

U.S. PATENT DOCUMENTS

| | | | |
|---|---|---|---|
| 2,300,263 | 10/1942 | McLeod . | |
| 2,553,940 | 5/1951 | Quartullo . | |
| 3,125,321 | 3/1964 | Van Domelen . | |
| 3,340,773 | 9/1967 | Franz . | |
| 3,565,111 | 2/1971 | Pearson . | |
| 3,670,768 | 6/1972 | Griswold | 251/141 X |
| 4,244,396 | 1/1981 | Friedland et al. | 137/599 X |

FOREIGN PATENT DOCUMENTS

| | | | |
|---|---|---|---|
| 575440 | 2/1946 | United Kingdom | 91/459 |
| 800325 | 8/1958 | United Kingdom | 137/596.17 |
| 1209185 | 10/1970 | United Kingdom . | |

Primary Examiner—Gerald A. Michalsky
Attorney, Agent, or Firm—Markell Seitzman; Russel C. Wells

[57] ABSTRACT

A dual solenoid pneumatic pressure control valve having two oppositely acting solenoids, each solenoid containing a valve means responsive to solenoid activation signals for controllably opening one of a plurality of pressure communication conduits disposed within the body of the valve to enable modulated pressure communication between a plurality of reference pressure sources and an output port to control a pneumatic pressure responsive actuator.

1 Claim, 7 Drawing Figures

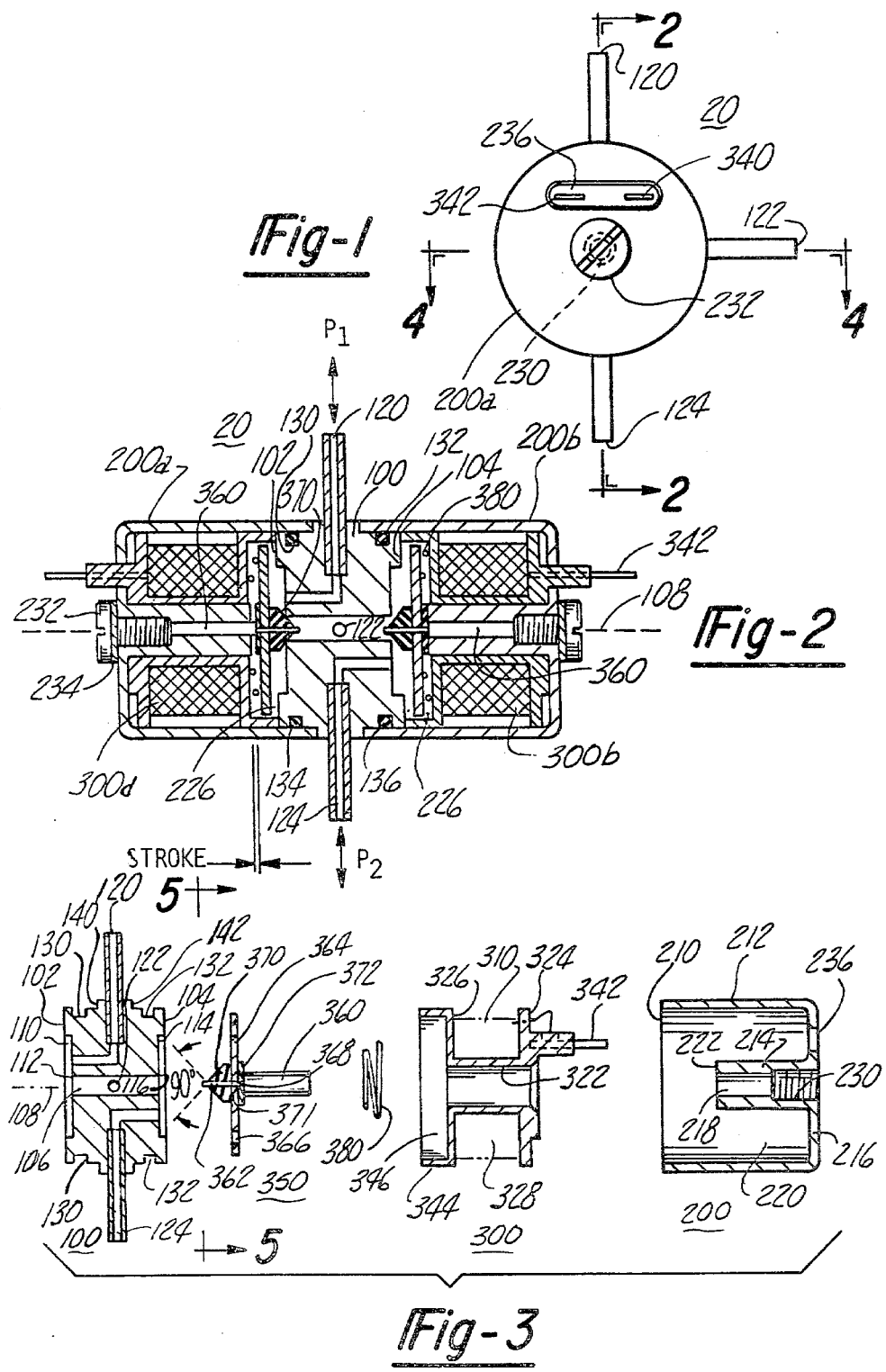

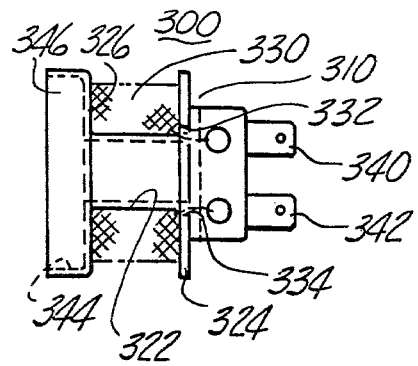
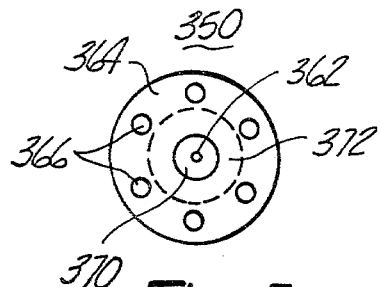
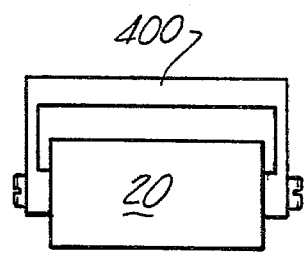
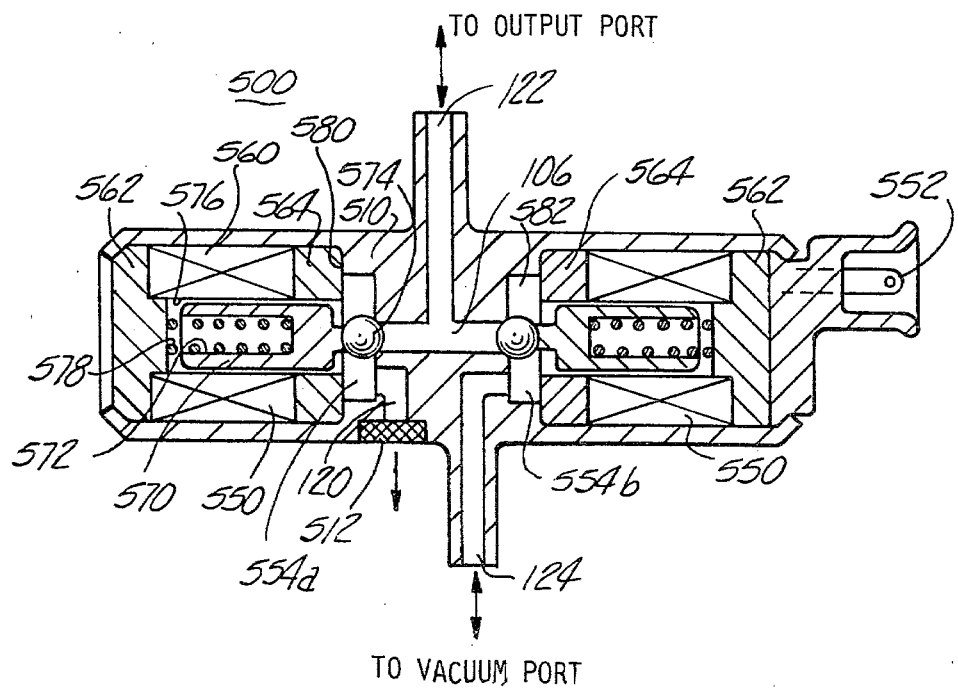

DUAL SOLENOID VACUUM MODULATOR

This is a division of application Ser. No. 946,883, filed Sept. 28, 1978, now U.S. Pat. No. 4,258,749.

BACKGROUND OF THE INVENTION

The invention pertains to electromagnetically activated pressure modulation valves, in particular, control valves containing two independently actuated solenoids.

The control of fluid flow utilizing electromagnetically actuatable solenoid valves is well known and has been generally applied to control the flow of viscous fluids in hydraulic systems, such as power steering systems or in refrigeration systems, as well as, in pneumatic systems such as automatic air-brake, welding and exhaust gas purification systems for emissions control of automobile emissions.

In nearly all of the uses of electromagnetic flow control valves, a valve member is required to form a fluid tight, i.e., pressure tight seal. The word fluid is used in its generic sense including both liquids and gases.

Illustrative of a first class of electromechanical solenoid valves is that class of valves containing a single solenoid. These valves provide essentially an on-off type of fluid control and are typically inserted directly within a fluid carrying conduit. When actuated they either permit or inhibit fluid flow.

Illustrative of this type of valve is Van Domelen's solenoid actuated flow valve as recited in U.S. Pat. No. 3,125,321, issued Mar. 17, 1964. Brunning in U.S. Pat. No. 1,557,192, issued Oct. 13, 1925, illustrates the use of a single solenoid valve to control the flow of water within a refrigeration system; while McLeod in U.S. Pat. No. 2,300,263 issued on Oct. 27, 1942, to control an air piston within a welding apparatus.

Furthermore, it has been realized that electromagnetic valves can and do more than merely restrict or enhance the flow of fluid within a simple conduit. Consider a second class of fluid control valves wherein the class is characterized by valves containing two solenoids. This class of valves can be utilized as amplification devices wherein a low pressure source is used to control and modulate the application of fluid under a different and higher pressure to fluid responsive mechanism. The use of a bi-valve as an amplification device in a pressurized hydraulic system is disclosed by Pearson in U.S. Pat. No. 3,565,111 which issued Feb. 23, 1971. Franz on the other hand utilizes two solenoids as shown in U.S. Pat. No. 3,340,773, issued Sept. 12, 1967, to control two valves in order to pressurize either side of a power diaphragm, which is integral with the valve body, to regulate the magnitude of the longitudinal movement of the piston. Activation of either solenoid causes a change in the pressure differential across the diaphragm.

To achieve efficient control of pneumatic pressure responsive actuators, such as an EGR valve (exhaust gas recirculation, part of an automotive emissions control system) requires a low cost control valve capable of modulating the applied vacuum at a high flow rate without severely bleeding the available engine vacuum.

To achieve precise position control of a pneumatic actuator within an emissions control system further requires a control valve characterized by a fast opening and closing time. A rapid and responsive control valve enables the application of electronic control technique such as pulse width modulation to control pressure communication and correspondingly yields a fine stepwise movement capability of the pneumatic actuator.

An object of the invention is a control valve capable of operating as a vacuum modulator or as a pressure modulator to provide precise control of a pneumatic actuator and having rapid response times.

Another object of the invention is a pneumatic actuator responsive to continuous electric current and pulsed current control methods.

The advantages of the present invention are that a precise low cost pneumatic modulator is achieved. In particular, when the control valve is used as a vacuum modulator, to control an actuator such as an EGR (exhaust gas recirculation) valve, control is achieved without a continuous air bleed from the vacuum source. In addition, minute actuator repositioning is possible because of the quick response times (6 millisecond opening, 2 millisecond closing) achieved by the present design. Furthermore, testing has shown that the modulator does not exhibit any significant changes in performance over a wide temperature range from ($-40°$ F. to $+250°$ F.) as compared to performance conducted in an ambient environment. In addition, to enhance the speed of response of the valve, the maximum developed magnetic forces exerted upon a slideable valve are mechanically controlled.

SUMMARY OF THE INVENTION

The invention is an efficient solution to problems associated with control valves especially pneumatic control valves used to modulate the fluid pressure applied to a vacuum actuator. In a more fundamental sense the invention can be modified for use as an on-off control valve employing a single solenoid.

The foregoing objects and advantages of the invention will become apparent as the description of the various embodiments proceed. Accordingly the control modulator valve of the present invention includes a central valve body containing a transverse central bore, coaxial to a central axis. The bore is in direct fluid communication with an output port adapted to be connected to a pneumatic actuator.

The central bore terminates in a pair of valve seats, adapted to sealably engage by a pair of moveable valve means, located at each end of the valve body. Each valve seat is adjacent to an actuation chamber formed by a countersunk bore and a solenoid. In addition, the valve body contains a first and second pneumatic port, which extend through the valve body into each bore and are adapted to receive a first and a second reference pressure source.

Two of the features of the present invention which permit achieving a low cost yet fast responding modulator is the incorporation of a thin nonmagnetic spacer on an armature assembly to control the minimum air gap between the armature and a valve guide and that the armature has been designed having a short stroke.

An additional feature of the present invention is that each cylindrical housing section can be formed from a sheet of steel using a deep draw process. This eliminates costly precision machining steps and reduces the cost of the total modulator valve.

In addition a central valve body interposes two housing sections. Each housing section contains a central member which functions as the valve guide and each housing is further adapted to mate with one of the two ends the central valve body therein sandwiching one of two independently actuatable solenoids therebetween. Each solenoid cooperates with the central valve body and housing section to form an actuation chamber. Furthermore, each solenoid contains a moveable element, a valve means, slideably disposed with each actuation chamber, and each valve guide. Each valve means is responsive to the control signals applied to a particular solenoid. Each valve means further contains a valve adapted to mate with its responsive valve seat and a ferromagnetic armature plate and a valve stem.

Each valve is normally biased into closing against one end of the central bore. Energizing a solenoid attacts the armature plate; moving the valve means off from its valve seat therein establishing pressure communications from an external pressure reference through the valve body to a pneumatic actuator adapted to communicate with the actuator port (output port) of the valve body. Upon deactivation of the solenoid the valve means reseats therein terminating pressure communications.

BRIEF DESCRIPTION OF THE DRAWINGS

FIG. 1 is an end view showing the exterior of the control modulator valve.

FIG. 2 is a sectional view through section 2—2 of FIG. 1.

FIG. 3 is an exploded drawing of one half of the modulator valve showing, in isolation, a housing section, a solenoid, containing a bobbin assembly, spring and armature assembly and a valve body.

FIG. 4 is a side view of the bobbin assembly of the solenoid through section 4—4 of FIG. 1.

FIG. 5 is a front view of the armature plate taken through section 5—5 of FIG. 3.

FIG. 6 is a schematic drawing showing a modified vacuum modulator for use with positive control pressures including a clamp applied to each housing section.

FIG. 7 shows an alternate embodiment of a modulator valve.

DETAILED DESCRIPTION OF THE DRAWINGS

A control valve such as a dual solenoid pneumatic modulator valve 20 is shown in FIGS. 1, 2 and includes two solenoid housings 200a and 200b enclosing two oppositely mounted electrically actuated solenoids 300a and 300b separated by a central valve body 100. The modulator valve 20 as disclosed is operable as vacuum modulator capable of communicating a controlled vacuum from an external source to the appropriate input port of a vacuum actuator. In addition the modulator 20, with minor changes, which will be discussed later, can operate at positive pressures and can be used as a power modulator for actuating power throttles or as a modulator in an air brake pressure supply system. The following discussions will be primarily addressed to the use of the device as a vacuum modulator. The following is a description of the central valve body 100 which is shown in detail in FIG. 3, the exploded diagram.

The valve body 100 is a generally cylindrical member containing a first end 102, a second end 104, both ends having a circular cross-section and a transverse central bore 106 which is concentric to a central axis 108. The valve body 100 can be fabricated from a nonferromagnetic material such as injection molded plastic or from machined or cast aluminum.

In the preferred embodiment ends 102 and 104 are maintained perpendicular to the central axis 108. In addition, end 102 contains an inwardly directed cylindrical bore 110. The bore 110 preferably intersects one end of the central bore 106 at a right angle. The intersection therein forms a valve seat 112. In a similar manner the end 104 contains a second bore 114 which intersects the other end of the central bore 106 to form a second valve seat 116.

The central valve body 100 further contains two circumferential channels 130 and 132, one located proximate the ends 102 and 104 respectively. A resilient sealing means such as O-rings 134 and 136 are received within and extend above each channel 130 and 132. During assembly of the control valve, each housing section 200 is fitted over the valve body ends (102, 104) the inner dimension of each housing section 200 is sized to compress an O-ring to form a pressfit pressure tight seal.

FIGS. 1, 2 and 3 also show in varying detail three hollow tubular conduits extending radially from the valve body 100. These conduits include a vent port 120, actuator (or output port) port 122, and vacuum port 124, providing fluid communication passages to and from the valve body 100.

In particular port 120 connects bore 110 to a first reference pressure source $P_1$, and port 124 connects bore 114 to a second reference pressure source $P_2$. Port 122 extends into the valve body 100 and connects the central bore 106 to the external environment which may be the input port of a pneumatic actuator (not shown).

As shown in FIG. 1 the vent port 120 and vacuum port 124 are located 90 degrees away from the actuator port 122 as measured along the circumference of the outer surface of the valve body 100. The orientation of the above mentioned ports may be varied to meet the dictates of the operating and mounting environment.

It is believed that a requirement of utilizing two sealing means, such as the O-rings, to effect a pressure tight seal at both housing section, valve body interfaces can be dispensed with. As an example consider the modulator 20 operating as a vacuum modulator with port 120 vented to the ambient environment and an external vacuum source connected to the port 124. During unactivated times when the central bore 106 is plugged the pressure within the right hand housing section 200b will stabilize at the pressure $P_2$ of the vacuum source. Obviously a pressure tight seal is necessary to isolate the interior of housing section 200b from the environment which is at ambient pressure. However, it can be seen that during these times the pressure interior to the left-hand housing section 200a will stabilize at the pressure of the reference pressure source $P_1$ applied to port 120. In this application the reference pressure is ambient pressure consequently the pressure tight seal between the housing section 200a and the valve body 100 may be eliminated. Of course, one does realize that some type of sealing engagement is necessary to keep the housing section 200a and valve body 100 together. However, this sealing need not be pressure tight.

FIGS. 2 and 3 further illustrate that the valve body 100 also contains two circumferential shoulders 140 and 142 to receive the open ends of housing sections 200a and 200b.

Consider a typical housing section 200a as shown in FIGS. 2 and 3. The housing section 200 is a multipurpose structure serving in part to isolate a solenoid 300 from the external environment and to properly orient solenoid members such as moveable valve relative to the central bore 106 within the valve body 100. In addition each housing section 200 provides a return path for the magnetic flux which is generated upon the actuation of either solenoid 300. Each housing section 200a, 200b is an integrally formed magnetically conductive cup-like structure. To reduce the production costs of the modulator 20, each housing section is formed from a sheet of steel having a suitable thickness by using a known metal working technique such as a multi-step deep draw process. Alternatively each housing section 200a, 200b can be machined to the desired shape and specification.

Reference is again made to the FIGS. 1, 2 and 3 which disclose many of the features of each housing section 200a or 200b. A housing section contains an open end 210, a cylindrical portion formed by outer member 212, a cylindrical portion formed by inner member 214 and a bottom 216 which joines one end of each of the members 212 and 214. The outer cylindrical member 212 provides sidewalls and in cooperation with the bottom 216 give each housing section 200 its cylindrical cuplike appearance. The inner member 214 contains a central channel 218 and is oriented upon the bottom 216 so that the central channel 218 is co-axial to the axis of the cylindrical outer member 210 forming a toroidal coil space 220 therebetween. More particularly the housing section elements (210–216) are adapted to mate with the shoulders 140 and 142 of the valve body 100 so that when the modulator 20 is assembled the central channel 218 is maintained coaxial to the central axis 108 of the valve body 100.

The hollow inner member 214 functions as a means for centering a coil of wire which is received into the toroidal chamber 220. Additionally, the inner member 214 in particular the central channel 218 provides a means for orienting and guiding a valve into seating engagement with one of the valve seats 112 or 116 of the valve body 100. For the inner member 214 to effectively guide and orient the valve relative to its seat it is desirable that an end 222, of the inner member 214 opposite the bottom 216 be maintained, when assembled, perpendicular to the central axis 108 and spaced apart from any portion of the valve body 100. To achieve the required spacing, it was found desirable to permit the length of the cylindrical member 212 to be greater than the length of member 214.

It is not necessary that the central channel 218 extend through the bottom 216 at opening 230 as illustrated in FIG. 2, however, if this is the case, it is necessary to seal the opening 230. A simple seal can be accomplished by inserting a thread screw 232 as shown in FIGS. 1 and 2 in combination with a sealing washer 234. Alternatively, the screw threads can be wrapped with Teflon tape or sealing may be accomplished by using a sealant such as Torseal. Each housing section 200 is further adapted to permit control signals to be communicated to the solenoids 300a and 300b. In the embodiment shown in FIGS. 1, 2, and 3, this adaptation can be a opening 236 in the bottom 216 which can be sealed as required.

Reference is now made to FIGS. 3 and 4 which disclose the components of the solenoid 300 and again to FIG. 2 which illustrates the cooperation between each assembled housing sections 200a, 200b and both solenoids 300a, 300b. Each solenoid 300 contains a bobbin assembly 310 adapted to receive an armature assembly 350 as shown in FIGS. 3 and 5. Consider the bobbin assembly 310 as shown in FIGS. 3 and 4. The bobbin assembly 310 consists of a bobbin preferably fabricated from a nonconductive, nonmagnetic material such as plastic. The bobbin further includes a hollow tubular center core 322 interconnecting two circular plates 324 and 326 forming a coil space 328 therebetween for a suitably wound coil 330 having a plurality of turns of electrical wire. The ends of wire of each coil 330 are passed through slots 332 and 334 in the plate 324 and attached to a plurality of electrical connectors such as push in spade-lugs 340 and 342 which are attached to the end plate 324. In addition, the plate 326 contains a sidewall 344 extending away from the coil space 328 forming a cup-like recess 346. The sidewall 344 is of a sufficient length to securely locate the bobbin assembly 310 between the valve body 100 and the bottom 216 of either housing section 200a or 200 b. In particular the exposed sidewall 344 abuts an end such as end 102 or 104 of the valve body 100 so that upon assembly, the valve body 100 and recess 346 form the actuation chamber 226 (see FIG. 2).

In the preferred embodiment the bobbin assembly 310 and housing sections 200a or 200b further cooperate so that, in their assembled positions, member 214 extends into the recess 346.

Alternatively, the bobbin assembly 310 and housing sections can be sized so that member 214 resides below the recess 346. In this manner the armature plate of the armature assembly cannot contact member 214. Thus, the minimum air gap and hence the maximum magnetic forces are controlled. The bobbin assembly 310 can be fabricated from a plastic material or as discussed in an alternate embodiment can be ferromagnetic. The outer dimensions of end plates 324, 326 and sidewall 344 are sized to fit within the inner surface of the housing 200a,b. Furthermore the outer surface of member 214 and the core 322 are sized to permit the bobbin assembly 310 to be slideably received and centered within the torroidal cavity 220 of each housing 200.

Attention is now directed to FIGS. 3 and 5 which illustrate the features of the armature assembly 350. The armature assembly comprises a rod-like member such as a plastic stem 360 having a threaded end 362. A disk-like armature plate 364, fabricated from soft steel, having an array of holes 366 to reduce windage and friction effects and a central mounting hole 368 is adapted to slideably mount over the threaded end 362 of the stem 360. A conically shaped valve 370 fabricated from an elastomer or Teflon-like material which is compatible with the fluid being communicated is threadably attached to the end 362 therein securing the armature plate 364 against shoulder 371. To achieve a leak resistant seal when the valve 370 seats with a coacting portion of the central core 106 valve body 100 it was found that the central angle of the cone shape valve 370 should be approximately 90 degrees as shown in FIG. 3. Alternatively, a spherically shaped valve could be used. This valve is disclosed in the alternate modulator valve embodiment.

Further inspection of FIG. 3 reveals a spacer 372 of suitable thickness, such as 0.003 inches attached to the armature plate 364 on the side opposite the valve 370. The spacer 372 can be a thin washer fabricated of nonmagnetic material such as Teflon. A purpose of the spacer 372 is to prevent the steel armature plate 364 from making contact with portions of the steel housing. Alternatively, the spacer 372 can be mounted to the end of member 214 rather than attached to the armature assembly 350. By controlling the minimum air gap between the armature plate and housing, the maximum magnetic forces are likewise controlled. Furthermore, by regulating the maximum magnetic forces, the reaction time in particular, the closing time of the modulator 20 is improved.

Prior to insertion of the valve stem 360 into its valve guide; i.e. member 214 a spring member 380 is inserted between the bobbin assembly 310 and armature plate 364. The spring member 380 shown in FIG. 3 is a nesting conical spring, however, a wave or spring washer can be substituted.

The armature assembly 350 and as will be later discussed, the plunger 570 of the alternate embodiment comprise a valve means for providing modulatable communications between either pressure reference and the pneumatic actuator to be controlled.

The operation of the vacuum modulator 20 is as follows. A pressure reference, such as a vacuum source (not shown) is connected to the vacuum port 124. A second pressure reference at a different pressure is connected to the vent port 120. In the present application the port 120 is vented to atmospheric pressure. In a quiescent state, that is, when no electric control signals are applied to either solenoid 300 each valve 370 is biased against its corresponding valve seat 112 or 116 by the spring member 380 thereby closing off the traverse control bore 106; modulated pressure communication is therefore prevented between the pressure references to the actuator port 122 (output port). Energizing the right hand solenoid 300b shown in FIG. 2 causes the ferromagnetic armature plate 364 to be attracted towards the bobbin assembly 310. A magnetic force of attraction is developed of sufficient magnitude to overcome the bias force exerted against the armature plate 364 by the spring member 380. This attractive force urges the armature assembly 364 away from the valve seat thereby unseating the valve 370 and permitting pressure communication from the pressure reference ($P_2$) i.e. vacuum source, to the actuator port. The armature assembly 350 will move towards the bobbin assembly 310 until the nonmagnetic spacer 372 seats against the cylindrical inner member 214. Upon de-energizing of the solenoid 300 the magnetic field strength reduces below the level of the force exerted by the spring member 380. The armature assembly 350 is again positioned against the valve body 100 terminating communication from the vacuum source to the pneumatic actuator.

To achieve a pneumatic system having performance characterized by a high sensitivity and capable of precisely controlling a pneumatic actuator requires a modulator 20 capable of passing large volumes of air as well as well as on having fast response times. As previously noted, performance is enhanced by controlling the magnitude of the magnetic field which is done by controlling the minimum gap between the armature plate 364 and housing section 200. The minimum gap is of significance because as the spacing between the slideable armature assembly and the inner member 214 decrease, the magnetic forces increase sharply. Excessive field strength increases the time necessary for the spring force to overcome the residual magnetic forces to reseat the valve. To achieve the improved performance which resulted in a valve opening time of 6 milliseconds and a valve closing time of 2 milliseconds the design called for a developed magnetic flux of 10,000 Gauss to produce a force of 1.25 kilograms at the smallest air gap (0.003 inches, the thickness of the spacer 372). In addition the minimum cross-sectional area of the ferromagnetic inner member 214 was designed at a minimum of 0.44 square centimeters and the valve stroke was approximately 0.025 inches. The degree of vacuum existing at the actuator port 122 can be varied by controllably permitting pressure communications with the second pressure reference by applying pulse width or other control signals to each solenoid 300. With neither solenoid energized the actuator port 122 and hence an actuator such as an EGR diaphragm vacuum actuator is isolated from the vacuum source, consequently, there is no continuous bleed from either pressure reference.

The modulator 20 of FIG. 2 is also capable of supplying a modulated positive pressure to a remote pneumatic actuator. In this case the modulator 20 could be powered through either a 60 psig supply which is typically used for actuating many power throttles or the 120 psig air brake supply pressure. Recalling that as designed, the modulator 20 is primarily targeted for vacuum operation. The vacuum pressure $P_2$ will be contained within the solenoid enclosure or housing section 200b. For a vacuum supply, a force is directed toward the center of the modulator 20 holding the valve body 100 and housing section 200b together. In the case of supplying a positive pressure, the force would be in the opposite direction tending to separate the pieces, consequently a clamping means such as a simple clamp 400 shown in FIG. 6 can be integrated in the housing sections 200a and b to hold both sections together. An alternate clamping means would necessitate adapting the valve body 100 and housing sections 200 to threadably engage one another at the shoulder (140, 142) housing interface. Referring again to FIG. 2, a positive pressure sources will also produce a force that will tend to unseat the valve 370; this may necessitate using a stiffer spring 380 than used for vacuum application. In addition because of the large pressure applied to the valve body 100 an aluminum valve body can be substituted for injection molded plastic body used for vacuum conditions.

An alternative embodiment of the modulator valve of FIG. 2 is shown in FIG. 7. The alternate modulator 500 differs from the modulator 20 in that the central valve body 100 and housing sections 200 have been combined into a single housing 510 having a plurality of pressure communications conduits, in particular, a vacuum port 124, actuator (output) port 122, vent port 120, and central bore 106. An integral ambient air filter 512 is disposed within the housing 510 so that it can filter out particulates in the ambient air prior to their entry into the modulator 500. The modulator 500 similarly contains two solenoids 550 adapted to receive electric control signals. A single connector location 552 is shown; however, two separate electrical connectors as previously discussed can also be utilized.

It is apparent that if a single connector is used at least three electrical terminals must be provided with the connector 552 to accommodate the two input wire ends of each coil and the two return ends which may be joined in common as well as a feedthrough in the valve body 510 for the wires of the lefthand solenoid.

The housing 510, in addition to the pressure communications conduits (120, 122, 124) contains two opposingly situated bores 554a, 554b one bore such as 554a connecting the vent port 120 with the central bore 106. While a second bore such as bore 554b connects the vacuum port 120 to an opposite end of bore 106.

Each solenoid 550 consists of a coil 560 of wire disposed between two plates 562 and 564. These plates are preferably fabricated from a ferromatic material. The plates 562 and 564 also function as pole pieces controlling the magnitude and direction of the magnetic field produce upon solenoid actuation. Each solenoid 550 further contains a plunger 570 having a bore 572 at one end and adapted to receive a valve 574 at its other end. Each plunger 570 is sized to slideably engage the cylindrical center core 576 of coil 560. A helical spring 578 is disposed within and extends from bore 572. During assembly when the plunger is inserted within bore 576 the spring 578 reacts with plate 562 so that when assembled a spring force is exerted on the plunger 570 urging the valve 574 into one end of the central core 106. In addition each solenoid 550 is received within the appropriate bore 554 of the housing so that it abuts a concentric shoulder 580 thereby maintaining plate 564 spaced apart from an end of bore 106 forming an actuation chamber 582 therebetween. In its neutral state each spring 578 urges both valves 574 into closing relationship with bore 106. Upon activation each plunger 570 is moved outwardly, therefore, selective pressure communication between ports 120 and 124 and the actuator (output) port 122 is established.

Changes and modifications in the specifically described embodiments can be carried out without departing from the scope of the invention which is intended to be limited only by the scope of the appended claims.

What is claimed is:

1. A control valve comprising:

a valve body having a central axis, and a first end and a second end both perpendicular to said central axis of said valve body, each end containing a countersunk boss concentric to said central axis, said valve body further having a central bore coaxial to said central axis and joining each of said bosses, said central bore and each boss therein forming a pair of valve seats, said valve body further containing a first port, extending through said valve body connecting with one of said bosses, a second port extending through said valve body, connecting with the other of said bosses and a third port extending through said valve body connecting with said central bore;

a split housing means having two housing sections for enclosing said first end and second end;

each housing section being a generally cylindrical cupshape structure containing sidewalls, a bottom, and a valve guide means having a central channel, which when assembled is coaxial with the central axis of said valve body;

a pair of valve means for controllably establishing pressure communications among said first, second and third ports, each of said valve means slideably disposed within the central channel of a corresponding one of said valve guide means and biased against one of said valve seats to close each end of said central bore and including:

a pair of electrically actuatable solenoid coil assemblies concentrically disposed in said housing about said valve guide means for generating a magnetic holding force for unseating said valve means from said valve seat; and a nonmagnetic spacer disposed on said valve means between said valve means and said valve guide means for limiting the magnetic holding force exerted on said valve means;

wherein each of said valve means includes:

a rod-like member, adapted to be received within said central bore;

a resilient valve attached to one end of said rod-like member; and a ferro-magnetic plate situated between said rod-like member and said valve, said plate having a larger diameter than said valve; and wherein said nonmagnetic spacer comprises a washer-like member mounted to said plate on an opposing surface opposite from said valve.

* * * * *